United States Patent Office 3,433,834
Patented Mar. 18, 1969

3,433,834
NITRATION OF 11a-CHLORO TETRACYCLINES
Robert Winterbottom, New City, Panayota Bitha, New York, and Henry Marcel Kissman, Nanuet, N.Y., assignors to American Cyanamid Company, Stamford, Conn., a corporation of Maine
No Drawing. Filed Mar. 14, 1966, Ser. No. 533,824
U.S. Cl. 260—559
Int. Cl. C07c *103/28*
10 Claims

ABSTRACT OF THE DISCLOSURE

This disclosure describes a process for preparing various 7- and/or 9-nitrotetracyclines by nitrating an appropriate 11a-chlorotetracycline with nitronium tetrafluoroborate followed by removal of the 11a-chloro group by treatment with sodium bisulfite.

---

This invention relates to a novel process for preparing compounds having the following general formula:

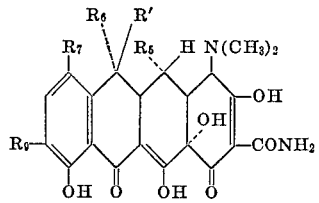

wherein $R_5$ is hydrogen or hydroxy, $R'$ is hydrogen or hydroxy, $R_6$ is hydrogen or methyl, $R'$ and $R_6$ taken together is methylene, $R_7$ is hydrogen or nitro and $R_9$ is hydrogen or nitro with the proviso that $R_7$ and $R_9$ cannot both be hydrogen. More particularly, the present invention comprises nitrating a compound of the general formula:

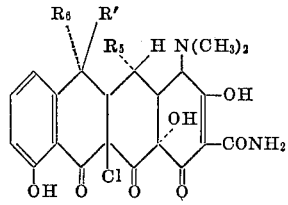

wherein $R_5$, $R'$ and $R_6$ are as hereinabove defined, with nitronium tetrafluoroborate in a polar solvent inert to the reactants, followed by removal of the 11a-chloro group from the intermediate 7- and/or 9-nitro-11a-chloro derivative by treatment with sodium bisulfite in aqueous media.

Specific starting materials operable in this nitration process include 11a-chlorotetracycline,
5-hydroxy-11a-chlorotetracycline,
5-hydroxy-6-methylene-11a-chlorotetracycline,
6-demethyl-11a-chlorotetracycline,
6-deoxy-11a-chlorotetracycline,
6-demethyl-6-deoxy-11a-chlorotetracycline,
6-methylene-11a-chlorotetracycline,
5-hydroxy-6-demethyl-11a-chlorotetracycline,
5-hydroxy-6-deoxy-11a-chlorotetracycline, and
5-hydroxy-6-demethyl-6-deoxy-11a-chlorotetracycline.

As will be apparent from the examples which follow, the nitration of the tetracycline starting materials results in two mononitro isomers with the nitro group attached to the aromatic ring of the tetracycline nucleus in the ortho-position to the hydroxyl group in one compound and in the para-position to the hydroxyl group in the other compound, or in other words, in one isomer the nitro group is in the 7-position of the aromatic ring whereas in the other isomer it is in the 9-position. These mononitro isomers may be readily separated by standard methods such as fractional crystallization or paper strip chromatography. If a mononitro derivative is desired, then 1.2 molar equivalents of nitronium tetrafluoroborate are employed, whereas if the 7,9-dinitro derivative is desired, then 2.4 molar equivalents of nitronium tetrafluoroborate are employed.

Inert polar solvents suitable for the novel nitration process of the present invention include, for example, nitromethane, acetonitrile, dimethylformamide, nitrobenzene, etc. These solvents, or mixtures thereof, should be employed in the anhydrous state.

Temperature is not a critical factor. Temperatures of from about 0° C. to about 35° C. can be employed. A temperature of from about 15° C. to about 25° C. is, however, preferred since it produces the desired nitration products in higher yield. Somewhat higher temperatures, while operative, tend to result in diminished yields. The time of reaction is likewise not a critical factor. The time necessary to obtain substantially complete reaction varies, of course, with the reaction temperature and the reactivity of the particular tetracycline starting material employed. In the preferred temperature range of from about 15° C. to about 25° C., a reaction period of from about one hour to about four hours results in substantial nitration of the tetracycline starting material.

The products are recovered from the nitration mixture by conventional methods. For example, the product may be isolated by precipitation with a solvent such as diethyl ether or hexane or by concentration, usually under reduced pressure, or by a combination of these. Work-up of the reaction mixtures to obtain the desired 7- and/or 9-nitro-11a-chloro derivatives may also be accomplished by known procedures such as precipitation, concentration, solvent extraction, or a combination of these procedures. After isolation, the products may be purified by any of the generally known methods for purification of tetracycline compounds. These include recrystallization from various solvents and mixed solvent systems, chromatographic techniques, and counter current distribution, all of which are usefully employed for this purpose.

The tetracycline starting materials may be employed in the novel nitration step of the present invention either in the form of their free bases or in the form of their salts with various organic and inorganic acids, depending upon the solubility characteristics desired.

The removal of the 11a-chloro group from the intermediate 7- and/or 9-nitro-11a-chloro derivatives obtained from the nitration step is accomplished by treatment with sodium bisulfite in an aqueous solution at a pH of about 6.0. This reduction is best carried out with an equimolar excess of sodium bisulfite over a period of time of from about 1 to about 4 hours at room temperature. The final products may be readily obtained from the aqueous reaction mixture upon acidification with mineral acid and filtration or by extraction with butanol.

The 7- and/or 9-nitrotetracyclines prepared by the novel nitration process of the present invention are useful as intermediates in the preparation of biologically active substituted 7- and/or 9-aminotetracyclines as is more fully set forth in U.S. Patent 3,148,212 to Boothe et al. and in our copending applications filed concurrently herewith.

Typical compounds which may be prepared by the novel nitration process of the present invention include, for example, 7-nitrotetracycline,
9-nitrotetracycline,
6-demethyl-7-nitrotetracycline,
6-demethyl-9-nitrotetracycline,
5-hydroxy-7-nitrotetracycline,
5-hydroxy-9-nitrotetracycline,
5-hydroxy-6-methylene-7-nitrotetracycline, 5-hydroxy-6-methylene-7,9-dinitrotetracycline,
6-demethyl-6-deoxy-7-nitrotetracycline,
6-demethyl-6-deoxy-7,9-dinitrotetracycline,
6-deoxy-9-nitrotetracycline,
6-deoxy-7,9-dinitrotetracycline,
7-nitro-6-methylenetetracycline,
9-nitro-5-hydroxy-6-demethyltetracycline,
7-nitro-5-hydroxy-6-deoxytetracycline, and
7,9-dinitro-5-hydroxy-6-demethyl-6-deoxytetracycline.

The following examples are given by way of illustration and are not to be regarded as limitations of this invention, many variations of which are possible without departing from the spirit or scope thereof.

Example 1.—Preparation of nitronium tetrafluoroborate

A 17 ml. (20 gm.; specific gravity 1.124) portion of nitromethane and 9.4 ml. (14 gm.) of fuming nitric acid were mixed in a polyethylene container held at −6° C. in a bath consisting of 20% isopropyl alcohol, 80% water and Dry Ice. A 4 ml. (3.94 gm.) portion of hydrofluoric acid was added and the mixture was saturated with boron trifluoride at −6° C. until boron trifluoride fumes were released. The white crystalline precipitate was filtered through a glass funnel under nitrogen atmosphere and then washed with 20 ml. of nitromethane and 20 ml. of 1,1,2-trifluorotrichloroethane (Freon 113). The material was transferred to a 3 neck flask and dried in vacuum at 60–70° C. for 1½ hours.

Example 2.—Preparation of 11a-blocked tetracycline and nitration to give 7-nitro and 9-nitro-11a-blocked tetracycline A 15 gram portion of tetacycline neutral was dissolved in a solvent mixture of 225 ml. of methanol and 375 ml. of benzene. The solution was evaporated to dryness under reduced pressure. The dried product was then dissolved in 187 ml. of distilled monoglyme. To this was added N-chlorosuccinimide and the mixture was stirred for 3 minutes. The solution was filtered. The clear filtrate was diluted with 200 ml. of water and the resulting suspension was stirred for 30 minutes. The product was isolated by filtration and dried at 40° C. for about 16 hours yielding 4.8 gm. of pure material having the following spectra:

$\lambda_{max.}^{0.1\ N\ H_2SO_4} = 268, 340\ m\mu$ with $268/340 = 4.95$ $\lambda_{max.}^{0.1\ N\ NaOH} = 235, 280, 350\ m\mu$ To a suspension of 1.1 gm. of 11a-chloroetracycline was added 0.388 gm. of nitronium tetrafluoroborate. The resulting solution was stirred for 1 hour at room temperature and then added slowly with stirring to 350 ml. of diethyl ether. The product was filtered, slurry washed with two 10 ml. portions of diethyl ether and dried at 35° C. and 2.5 mm. of pressure for 10 hours. The yield was 1.114 gm. of material having the following spectra:

$\lambda_{max.}^{0.1\ N\ H_2SO_4} = 265, 345\ m\mu$ with $265/345 = 4.3$ $\lambda_{max.}^{0.1\ N\ NaOH} = 235, 277, 350, 392\ m\mu$ Polarographic analysis gave 7-nitro=20.7% and 9-nitro=26.5%.

Example 3.—Preparation of 11a-blocked-6-demethyltetracycline and conversion to 11a-blocked-6-demethyl-7-nitrotetracycline and 11a-blocked-6-demethyl-9-nitrotetracycline A 10 gm. portion of 6-demethyltetracycline neutral was dissolved in a solvent mixture of 240 ml. of methanol and 360 ml. of benzene. The solution was evaporated to dryness under reduced pressure. The dried product was dissolved in 400 ml. of distilled dioxane. A solution of 3.22 gm. of N-chlorosuccinimide in 40 ml. of dioxane was added slowly with stirring. The reaction was complete in less than 1 minute. The solution was filtered and the filtrate was diluted with Skellysolve C. The light yellow precipitate was isolated by filtration and dried in a 35° C. vacuum oven for 16 hours. The yield was 10.5 gm. of crude product having the following spectra:

$\lambda_{max.}^{0.1\ N\ H_2SO_4} = 271, 347\ m\mu$ with $271/347 = 5.31$

To a suspension of 10 gm. of this 11a-chloro-6-demethyltetracycline in 210 ml. of nitromethane and 1.41 ml. of methanesulfonic acid was added 3.62 gm. of nitronium tetrafluoroborate. The solution was stirred for 2 hours at 24°–27° C. and then filtered. The filtrate was diluted with 4 liters of diethyl ether. The light yellow precipitate was collected and dried in a 35° C. vacuum oven for 16 hours. The yield was 10.5 gm. of crude product having the following spectra:

$\lambda_{max.}^{0.1\ N\ H_2SO_4} = 257, 347$ and $430\ m\mu$ with $257/347 = 4.6$ $\lambda_{max.}^{0.1\ N\ NaOH} = 275, 390\ m\mu$ with $380/460 = 1.46$ The 7- and 9-nitro isomers were separated.

Example 4.—Reduction of 11a-chloro-6-demethyl-7(9)-nitrotetracycline to 6-demethyl-7(9)-nitrotetracycline A 22 gm. portion of a mixture of 11a-chloro-6-demethyl-7-nitrotetracycline and 11a-chloro-6-demethyl-9-nitrotetracycline (prepared as described in Example 3) was suspended in 560 ml. of water. The pH was adjusted to 6.0 with 2 N NaOH. To this was added 44 gm. of sodium bisulfite with stirring while the pH was readjusted to 6.0 with 2 N NaOH. Stirring was continued for 2 hours at room temperature. The solution was filtered and the filtrate was acidified to pH 4.0 with concentrated HCl and the brown solid [crop No. 1 (8.8 gm.)] was isolated by filtration. Acidification was continued. At pH 2.0 a light brown precipitate was obtained [crop No. 2 (3.3 gm.)]. Finally the mother liquor was extracted with butanol at pH 2.0 and the extract was evaporated to dryness under reduced pressure [crop No. 3 (8.6 gm.)]. All three crops were analyzed to be mixtures of salts with the following U.V. spectra:

Crop No. 1 $\lambda_{max.}^{0.1\ N\ H_2SO_4} = 260, 355, 420\ m\mu$ with $260/355 = 2.9$ $\lambda_{max.}^{0.1\ N\ NaOH} = 230, 260, 372, 430\ m\mu$ with $380/460 = 1.05$ Crop No. 2 $\lambda_{max.}^{0.1\ N\ H_2SO_4} = 259, 355, 420\ m\mu$ with $259/355 = 3.01$ $\lambda_{max.}^{0.1\ N\ NaOH} = 221, 260, 372\ m\mu$ with $380/460 = 1.35$ Crop No. 3 $\lambda_{max.}^{0.1\ N\ H_2SO_4} = 261, 352\ m\mu$ with $261/352 = 2.81$ $\lambda_{max.}^{0.1\ N\ NaOH} = 278, 357\ m\mu$ with $380/460 = 2.36$ Example 5.—Preparation of 11a-blocked-5-hydroxytetracycline and conversion to 11a-blocked-5-hydroxy-7-nitrotetracycline and 11a-blocked-5-hydroxy-9-nitrotetracycline A 3.0 gm. portion of 5-hydroxytetracycline neutral was dissolved in a solvent mixture consisting of 135 ml. of methanol and 225 ml. of benzene. The solution was evaporated to dryness under reduced pressure. The dried product was dissolved in 135 ml. of distilled dioxane. A 1.05 gm. portion of N-chlorosuccinimide in 15 ml. of dioxane was added slowly with stirring. The reaction was complete in 3 minutes. The solution was filtered. The filtrate was diluted with 390 ml. of Skellysolve C. The product was isolated by filtration and dried at 40° C. for 15 hours. The yield was 2.7 gm.

$\lambda_{max.}^{0.1\ N\ H_2SO_4} = 267, 340\ m\mu$ with $267/340 = 5.45$ $\lambda_{max.}^{0.1\ N\ NaOH} = 277, 370\ m\mu$ A 1.0 gm. portion of this 11a-chloro-5-hydroxytetracycline was suspended in 40 ml. of nitromethane. To this was added a 0.34 gm. portion of nitronium tetrafluoroborate. The solution was stirred for 1 hour at 25° C. and was then added slowly with stirring to 350 ml. of diethyl ether. The solid was filtered, slurry washed with two-10 ml. portions of diethyl ether and dried at 40° C. and 2.4 mm. of pressure for 10 hours. The yield was 0.941 gm. having the following spectra:

$\lambda_{max.}^{0.1\ N\ H_2SO_4} = 258, 345\ m\mu$ with $258/345 = 4.62$ $\lambda_{max.}^{0.1\ N\ NaOH} = 275, 400\ m\mu$ Example 6.—Preparation of 11a-blocked-7-chlorotetracycline and conversion to 11a-blocked-7-chloro-9-nitrotetracycline A 1.0 gm. portion of 7-chlorotetracycline neutral was dissolved in a mixture of 50 ml. of methanol and 80 ml. of benzene. The solution was evaporated to dryness under reduced pressure. The dried product was dissolved in 400 ml. of distilled dioxane. A solution of 0.304 gm. of N-chlorosuccinimide in 35 ml. of dioxane was added slowly with stirring. The reaction was complete in 1 minute. The solution was filtered. The filtrate was diluted with 200 ml. of Skellysolve C. The product was isolated by filtration and dried in a vacuum oven. The yield was 0.93 gm. of crude material. A 200 mg. portion of this 7,11a-dichlorotetracycline was suspended in 10 ml. of nitromethane. To this was added 57 mg. of nitronium tetrafluoroborate. The solution was stirred for 1 hour at 25° C. and was then slowly added to 100 ml. of diethyl ether. The precipitate was isolated by filtration, slurry washed with two-10 ml. portions of ether and dried at 40° C. in a vacuum oven for 10 hours. The yield was 173 mg.

$\lambda_{max.}^{0.1\ N\ H_2SO_4} = 253, 350\ m\mu$ with $253/350 = 4.58$ $\lambda_{max.}^{0.1\ N\ NaOH} = 240, 275, 335, 425\ m\mu$ Example 7.—Reduction of 7,11a-dichloro-9-nitrotetracycline to 7-chloro-9-nitrotetracycline A 110 mg. portion of 7,11a-dichloro-9-nitrotetracycline was suspended in 15 ml. of water. The pH was adjusted to 6.0 with 2 N NaOH. Then 0.3 gm. of sodium bisulfite was added slowly with stirring. The pH was readjusted to 7.0 and the solution was filtered. The filtrate was acidified to pH 6.0 and stirred at that pH for one hour. The product was then extracted with eight 50 ml. portions of butanol. The extract was evaporated to dryness. The yield was 121 mg. of crude material.

Example 8.—Preparation of 11a-chloro-6-demethyl-6-deoxytetracycline and conversion to 11a-chloro-6-demethyl-6-deoxy-7-nitrotetracycline and 11a-chloro-6-demethyl-6-deoxy-9-nitrotetracycline A 4.5 gm. portion of 6-demethyl-6-deoxytetracycline neutral was dissolved in 43 ml. of acetic acid. A solution of 1.46 gm. of N-chlorosuccinimide was added slowly with stirring. The reaction was complete in 3 minutes. The solution was filtered. The filtrate was diluted with 500 ml. of diethyl ether. The solid which formed was isolated by filtration and dried in a vacuum oven. The yield was 2.5 gm. of crude material having the following spectra:

$\lambda_{max.}^{0.1\ N\ H_2SO_4} = 271, 345\ m\mu$ with $271/345 = 6.32$ $\lambda_{max.}^{KBr} = 5.71\ m\mu$ A 1.26 gm. portion of this 11a-chloro-6-demethyl-6-deoxytetracycline was suspended in 61 ml. of nitromethane. To this was added 0.474 gm. of nitronium tetrafluoroborate. The solution was stirred for 1 hour at 25° C. and was then slowly added to 370 ml. of diethyl ether. The precipitate was isolated by filtration, slurry washed with two 10 ml. portions of diethyl ether and dried at 40° C. and 2.4 mm. of pressure for 10 hours. The yield was 1.215 gm. of crude product having the following spectra:

$\lambda_{max.}^{0.1\ N\ H_2SO_4} = 262, 347\ m\mu$ with $262/347 = 4.84$

Polarographic analysis gave 26% 7-nitro isomer and 48.1% 9-nitro isomer. The 7- and 9-nitro isomers were separated.

What is claimed is:
1. The process of preparing compounds of the formula:

wherein $R_5$ is selected from the group consisting of hydrogen and hydroxy, $R'$ is selected from the group consisting of hydrogen and hydroxy, $R_6$ is selected from the group consisting of hydrogen and methyl, $R'$ and $R_6$ taken together is methylene, $R_7$ is selected from the group consisting of hydrogen and nitro and $R_9$ is selected from the group consisting of hydrogen and nitro with the proviso that $R_7$ and $R_9$ cannot both be hydrogen, which comprises contacting a compound of the formula:

wherein $R_5$, $R'$ and $R_6$ are as hereinabove defined, with nitronium tetrafluoroborate in a polar solvent inert to the reactants, and treating the so-obtained 7- and/or 9-nitro-11a-chloro derivative with sodium bisulfite in aqueous media.

2. A process according to claim 1 wherein $R_5$ is hydrogen, $R'$ is hydroxy, $R_6$ is methyl, $R_7$ is nitro and $R_9$ is hydrogen.

3. A process according to claim 1 wherein $R_5$ is hydrogen, $R'$ is hydroxy, $R_6$ is methyl, $R_7$ is hydrogen and $R_9$ is nitro.

4. A process according to claim 1 wherein $R_5$ is hydroxy, $R'$ is hydroxy, $R_6$ is methyl, $R_7$ is nitro and $R_9$ is hydrogen.

5. A process according to claim 1 where $R_5$ is hydrogen, $R'$ is hydrogen, $R_6$ is methyl, $R_7$ is nitro and $R_9$ is hydrogen.

6. A process according to claim 1 wherein $R_5$ is hydrogen, $R'$ is hydrogen, $R_6$ is methyl, $R_7$ is hydrogen and $R_9$ is nitro.

7. A process according to claim 1 wherein $R_5$ is hydrogen, $R'$ is hydroxy, $R_6$ is hydrogen, $R_7$ is nitro and $R_9$ is hydrogen.

8. A process according to claim 1 wherein $R_5$ is hydrogen, $R'$ is hydroxy, $R_6$ is hydrogen, $R_7$ is hydrogen and $R_9$ is nitro.

9. A process according to claim 1 wherein $R_5$ is hydrogen, $R'$ is hydrogen, $R_6$ is hydrogen, $R_7$ is nitro and $R_9$ is hydrogen.

10. A process according to claim 1 wherein $R_5$ is hydrogen, $R'$ is hydrogen, $R_6$ is hydrogen, $R_7$ is hydrogen and $R_9$ is nitro.

References Cited

Blatt et al., Replacement of halogen by hydrogen in nitro aryl halides: some applications in the thiophene series. Chem. Abstracts, vol. 52, 1958 (p. 7269 relied on).

ALEX MAZEL, *Primary Examiner.*

A. M. TIGHE, *Assistant Examiner.*